United States Patent

[11] 3,576,122

[72] Inventor John J. Churla, Jr.
    Raritan, N.J.
[21] Appl. No. 810,699
[22] Filed Mar. 26, 1969
[45] Patented Apr. 27, 1971
[73] Assignee Thomas & Betts Corporation
    Elizabeth, N.J.

[54] CRIMPING TOOL
    25 Claims, 17 Drawing Figs.
[52] U.S. Cl. .................................................. 72/413,
    72/465, 72/470
[51] Int. Cl. ........................................... B21d 9/08
[50] Field of Search ........................................... 72/413,
    410, 415, 416, 470, 465

[56]    References Cited
    UNITED STATES PATENTS
2,842,018  7/1958  Hammell ...................... 72/410
3,216,091  11/1965  Floyd .......................... 72/416
3,251,216  5/1966  Broske ........................ 72/416
3,276,239  10/1966  Achler ......................... 72/465
3,314,135  4/1967  Smith .......................... 72/410
3,417,599  12/1968  Burns .......................... 72/410

Primary Examiner—Charles W. Lanham
Assistant Examiner—Gene P. Crosby
Attorney—David Teschner ABSTRACT: The disclosure is directed to a die set in which at least one of the die members of the set includes a nest block composed of a semirigid, flexible material. Such die member comprises a support block for receipt of said nest block together with end blocks for restraining the nest block therebetween. The cooperating die member of the die set has a nest which permits entry of the nest block such that the shape of the nest of the nest block may be controlled jointly by the interaction between the nest block and the nest of the cooperating die member and the effects of an object placed therebetween. In other configurations of the die set both die members may include a nest block of semirigid, flexible material. In either of the embodiments the nest may be of uniform nest configuration such as a V-notch or an arcuate portion, or a composite configuration having an arcuate portion and straight sides. Raised portions may be introduced along the length of the nest in order to place greater force upon particular portions of the object placed in the die set.

PATENTED APR 27 1971
3,576,122
SHEET 1 OF 2
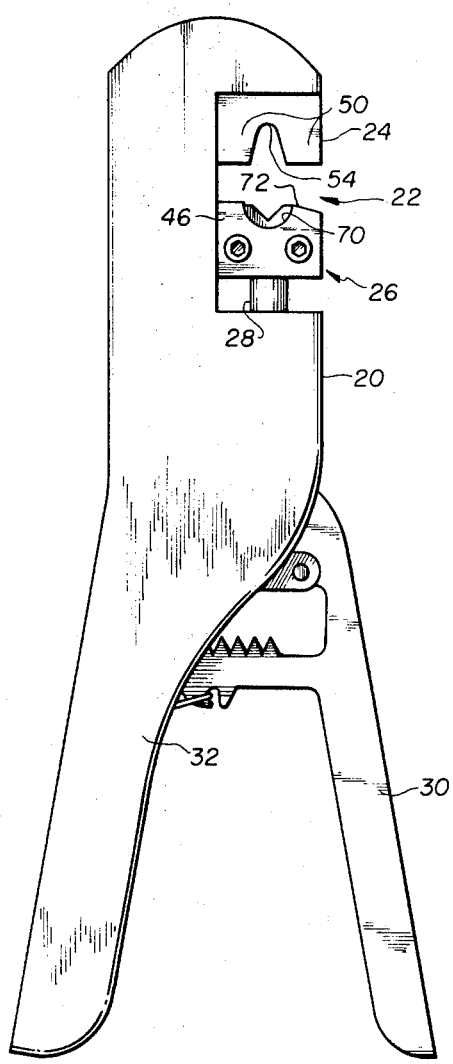
FIG.1
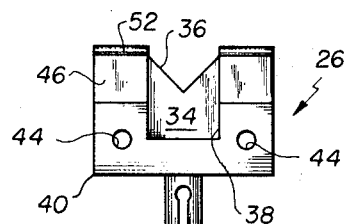
FIG.2
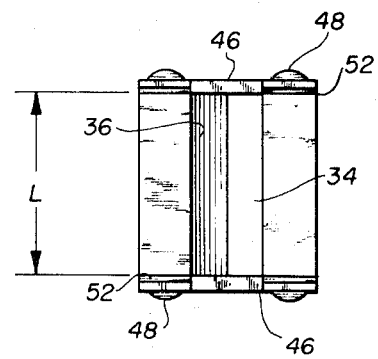
FIG.3
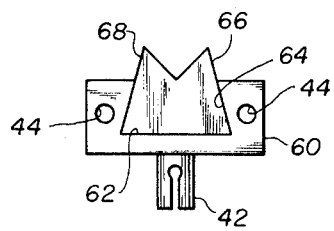
FIG.4
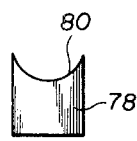
FIG.5
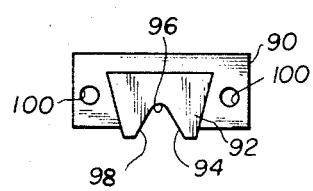
FIG.6
FIG.7
INVENTOR.
JOHN J. CHURLA, JR.
BY David Searlene
ATTORNEY INVENTOR.
JOHN J. CHURLA, JR.
BY David Teach
ATTORNEY

CRIMPING TOOL

CROSS REFERENCE TO RELATED APPLICATION

The connector shown in this application for illustrative purposes, is described and claimed in copending application Ser. No. 774,788, filed Nov. 12, 1968, entitled Connector for Shielded Conductors by John J. Churla, Jr. and assigned to the assignee of the instant application.

BACKGROUND OF THE INVENTION

1. Field of the Invention

The invention is directed to the field of crimping articles to or about other articles; for example, the crimping of an electrical connector to an electrical conductor. The instant tool has particular application to the application of electrical connectors to the outer grounding sheath of a coaxial connector where it is desired not to in any way effect the insulation extending between the outer shielding conductor and the central conductor thereof.

2. Description of the Prior Art

In prior art devices solderless connectors are generally installed by crimping or deforming a connector about the conductor to which it is to be joined. As the result of such crimping of the connector to the conductor, the conductor is generally formed in a shape established by the nest of the die set employed to create such crimping. In the case of a coaxial conductor, the geometry of the insulator extending between the central conductor and the outer shielding conductor is of great importance in that any variation of this geometry will effect the impedance of the conductor. In the prior art techniques of employing a fully metallic die set to crimp the connector to the conductor, a compromise must be made between the amount of crimping force which would leave the insulator intact and that which would assure a reliable connection between the conductor shield and the connector. Such compromise does not necessarily provide the best connection between for example, a grounding lead and the shield of the coaxial conductor while at the same time will necessarily somewhat distort the geometry of the inner insulation. Further, the meeting point of the two die members of the die set generally cause a flash to occur, that is cold flow extrusion of the material of the connector to the interspaces between the die members as the die members are closing. This produces a crimp outline which is generally irregular and which can effect the electrical impedance of the coaxial line. In addition, even in noncoaxial conductor connections the flashing produces a rough finished crimped terminal which may be abrasive to the insulation of conductors placed alongside and in contact with the crimped terminal.

The present invention overcomes the difficulties noted above with respect to prior art die sets by providing a die set capable of producing a flash free crimp which will permit a crimping action to take place which both positively couples the connector to the outer shielding conductor of the coaxial line and yet which does not distort or distorts to a very minimal level the geometry of the internal insulator. This is achieved by fabricating at least one of the die members of the die set from a semirigid, flexible material which can more accurately conform to the outer surface configuration of both the conductor and the connector and yet exert sufficient force upon the connector and conductor to insure a positive connection therebetween. One form of a die set constructed in this manner provides a first, or upper, die member made of a metal and which has a nest therein. The lower die member of the die set is fabricated comprising a nest block fabricated from a semirigid, flexible material having thereon a nest. The nest block is mounted within a supporting block and has affixed at the ends thereof end members for retaining the nest block within its position. The end members are so separated and the entire lower die member so constructed that the nest block alone of the lower die member may enter within the nest portion of the upper die member and will, due to its decreasing nest dimension, cause an exertion of forces on the nest block and thus alter the configuration of the nest within the nest block. The crimping of a connector to a conductor will be due jointly to the contact between the nest block and the nest of the upper die member, and the contact of the connector and conductor with both the nest of the upper die member and the nest block of the lower die member. Thus the nest block will exert forces upon the connector and will deform to accommodate the shape of the connector and conductor as the same are joined. The entry of the nest block into the nest of the upper die member prevents spaces between the die members thus eliminating flash.

In a further embodiment of the invention, both the upper and lower die members of the die set may be fabricated employing nest blocks of semirigid, flexible material, with the same provision for supporting blocks and end blocks as was described above.

The shape of the die nest itself may be that of a V-notch, with varying slopes depending upon the use or may be arcuate in shape or a composite shape having both an arcuate center portion and straight line end portions. In addition, over the length of the die, that is, along the length of the crimp to be created, raised portions may be provided within the die nest in order to achieve additional crimping at selected points. For example, it may be desirable to provide greater crimping forces at the center portion, in which case the nest would have a raised center portion. Alternatively, the entry and exit portions of the die nest may be raised or a combination may be made between a raised entrance and exit portions and a raised portion within the center. Each of these configurations can be made in dependence upon the particular form of connection which is to be achieved. It is therefore an object of this invention to provide an improved die set.

It is yet another object of this invention to provide an improved die set wherein at least one of the die members comprises a nest block fabricated from a semirigid, flexible material.

It is still another object of this invention to provide an improved die set in which one of the die members comprises a nest block fabricated from a semirigid flexible material supported by a support block and restrained and contained therein by means of end blocks.

It is still another object of this invention to provide an improved die set wherein one of the die members includes nest blocks made of a semirigid, flexible material and which is dimensioned to enter within the nest portion of the other die member to be constrained and controlled thereby.

It is yet another object of this invention to provide an improved die set wherein one of the die members comprises a nest block constructed of a semirigid, flexible material proportioned to fit within the nest of the cooperating die member such that the force exerted upon an object placed therein is controlled jointly by the effects of the mating of the die members and the connector itself within the die set.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWING

In the drawing in which similar elements are given similar reference characters:

FIG. 1 is a front elevation of a crimping tool having installed thereon a die set constructed in accordance with the concepts of the invention.

FIG. 2 is a front elevation of the lower die member of FIG. 1 with one of the end blocks removed to better illustrate the details thereof.

FIG. 3 is a top plan view of the lower die member of FIG. 1.

FIG. 4 is a front elevation of a modification of the lower die member of FIG. 1 with both end blocks removed.

FIG. 5 is a front elevation of an alternative form of the nest block shown in FIG. 2.

FIG. 6 is a front elevation of a further alternative arrangement of the nest block of FIG. 2.

FIG. 7 is a front elevation of an alternative embodiment of the upper die member of FIG. 1 with the end blocks removed to better show the details thereof.

DESCRIPTION OF THE PREFERRED EMBODIMENTS

Figure 8:
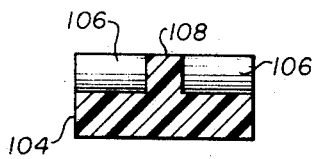
FIG. 8 is a side elevation, partially in section, of a modified form of a nest block of FIG. 2.

Turning now to FIG. 1 there is shown a crimping tool 20 having thereon a die set 22 constructed in accordance with the concepts of the invention. The crimping tool 20 is shown in greater detail in Design Patent DES 192,940, issued May 29, 1962, entitled Crimping Tool in the names of Martin and Schwester and assigned to the assignee of the instant invention. The disclosure of this patent is incorporated herein by reference. Die set 22 is composed of an upper die member 24 and a lower die member 26. The upper die member 24 is shown fixedly connected with the upper frame of the crimping tool 20 but if desired it may couple thereto by means of an adjustable screw, a clip, or the like. The lower die member 26 is coupled to the ram 28 of the tool 20 by a pin which will be described below. Briefly, as movable handle 30 is moved towards the fixed handle 32 the ram 28 is caused to move the lower die member 26 towards the upper die member 24. Conversely when the movable handle 30 is moved away from the fixed handle 32, the ram 28 moves downwardly such as to separate the lower die member 26 from the upper die member 24.

Turning now to FIGS. 2 and 3 the details of the lower die member 26 may be better understood. Die member 26 is comprised of a nest block 34 constructed of a semirigid, flexible material such that it may be distorted during a crimping operation but yet return to its original configuration once such operation has been completed. Placed in the top of the nest block 34 is a nest 36 which conveniently, as is shown in FIG. 2, takes the shape of a V-notch. The particular angle of the V-notch may be selected in accordance with its intended use and upon the diameter of the conductor and the size of the connector to be applied thereto. Nest block 34 fits within a recess 38 of a support block 40 as is shown in FIG. 2. The sidewalls of the recess 38 are straight as are the sidewalls of the nest block 34. Extending from the bottom surface of the support block 40 is a split pin 42 to permit the assembly of the lower die member 26 into a corresponding aperture (not shown) in the ram 28. Threaded apertures 44 are provided for receipt of fastening devices, to be described with reference to FIG. 3, for attaching to the support block 40 end blocks 46, only the rear one of which is visible in FIG. 2. As shown in FIG. 3, the end blocks 46 are attached at both ends of the support block 40 by means of fasteners 48 to constrain therebetween nest block 34. The nest block 34 is intentionally made somewhat longer than the support block 40 and is somewhat compressed by the application of the end blocks 46 and thus permitting the retention of the nest block 34 thereby.

It should be noted, as is shown in FIG. 2, that the nest block 34 extends above the surface of the support block 40 to permit receipt about nest block 34 of the legs 50 (see FIG. 1) of the upper die member 24. The spacing between the end blocks 46, indicated by the letter L is greater than the length of die member 24 along the length of the crimp and thus will be sufficient to permit the upper die member 24 to pass therebetween. The upper inside edges of the end blocks 46 are tapered as at 52 to facilitate the entry of the upper die member 24 between the edge blocks 46. The passage of the legs 50 of the upper die member 24 along either side of the nest block 34 as the nest block 34 enters the nest 54 of the upper die member 24 causes the nest 36 to be somewhat deformed by the contour of the nest 54 of the upper die member 24. As will be explained below this permits the nest 36 of the nest block 34 to better conform to the contour of the connector placed within the die set 22 to permit the exertion of additional forces in the upper reaches of the nest 36.

Turning now to FIG. 4 there is shown a variation of the nest block and support block of FIG. 2. As is shown in FIG. 4, support block 60 is provided with a split pin 42 for engagement with the ram 28 as was described above with reference to die member 26 and has tapped apertures as at 44 to receive fastening devices to permit assembly of end blocks similar to end blocks 46 of FIG. 2. The recess 62 is provided with inclined walls 64 which mate with the inclined wall 66 of the nest block 68. In this manner less reliance need be placed upon the end blocks for retaining of the nest block 68 within the recess 64 of the support block 60.

It should be noted that the end blocks 46, as shown in FIG. 1, have recess 70, which outline the full depth of the nest 36 of nest block 34 of FIG. 2. Similarly, the end blocks for use with nest block 68 of FIG. 4 would also have such recesses. The height and configuration of the recess 70 must be such that a full crimp is permitted during the deformance of the nest block 34 but not so high as to fail to provide proper support for the conductor just beyond the tool 20. The leading edge 72 of the end block 46 is tapered as at 72 to permit easy access to the die set 22.

Turning now to FIG. 5 there is shown a further nest 80 in a nest block 78. Nest configuration 80 is arcuate and may be a radius or some other generally circular section. Alternatively, as shown in FIG. 6, nest block 82 has a nest contour which is a composite of an arcuate portion 86 and straight line portions 88. The choice as to the particular contour of the nest is made in dependence upon the type of connection which is to be made.

Figure 9:
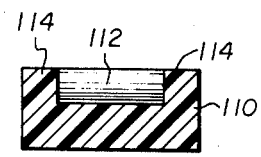
FIG. 9 is a side elevation, partially in section, of a further modification of the nest block of FIG. 2.
Figure 10:
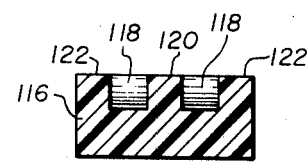
FIG. 10 is a side elevation, partially in section, of yet another embodiment of the nest block of FIG. 2.
Figure 11:
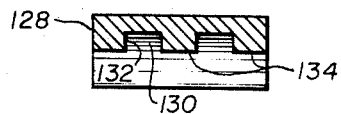
FIG. 11 is a side elevation, partially in section, of a modification of the upper die member of the die set of FIG. 1.

In addition to the lower die member 26 containing a nest block of semirigid, flexible material the upper die member 24 may be replaced by a die member 90 as shown in FIG. 7 including a nest block 92 constructed of a semirigid, flexible material. The nest 94 would have, as with nest 55 of the die member 24 of FIG. 1, an arcuate portion 96 and straight line portions 98. Tapped apertures 100 would be provided to receive fastening means for attaching end members (not shown) to support block 90. It should be noted that either, or both, of the die members can include a nest block of semirigid, flexible material. In each of the nest configurations, considered with respect to FIGS. 1 through 7, it has been assumed that the nest is uniform along its entire length L as described in FIG. 3. That is to say that the crimping effect of the die sets would be the same along the entire length of the crimp. However, at certain times it is found that it is desirable to exert particular force at points along the length of the nest to achieve particular results. For example, it may be desirable to put the greatest force upon the center of the coupling between the conductor and the connector, or it may be desirable to provide strain relief at the entry and exit points of the conductor into the connector. As shown in FIG. 8 a raised portion 108 has been built into the center portion of the nest block 104 which has a nest 106 thereon. By the employment of a raised center portion 108 greater force would be exerted at the center of the nest 108 than would be the areas adjacent the raised portion 108. Turning to FIG. 9 there is shown a nest block 110, having raised portions 114 at the opposite ends thereof and a nest 112 therebetween. These raised portions 114 would be adjacent the end blocks 46 as is shown in FIG. 3. In this manner greater force can be applied at the entry and exit points of the connector to provide strain relief for the conductor placed within the connector. In FIG. 10 both of the results achievable with the nests of FIGS. 8 and 9 may be combined into a single nest block 116 having nests 118, a raised center portion 120 and raised outer portions 122. In such an arrangement strain relief would be achievable at the ends of the connector while greater force would be exerted upon the center of the connector. In FIG. 11 there is shown a manner of modifying the nest 54 of the upper die member 24 to provide increased crimping action. In this arrangement the nest 130 of the die member 128 is fashioned with raised portions 132 at the ends and a raised portion 134 in the middle.

Figure 12:
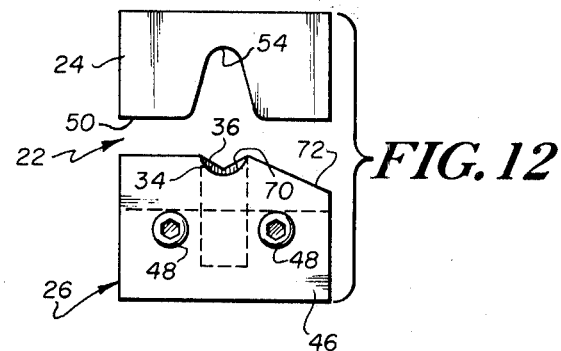
FIGS. 12 through 17 are front elevations of the die set of FIG. 1 shown in progressive steps as the die members are closed upon an electrical connector placed within the die set.
Figure 13:
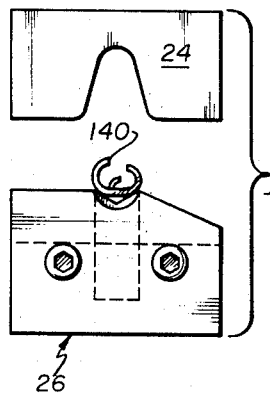
Figure 14:
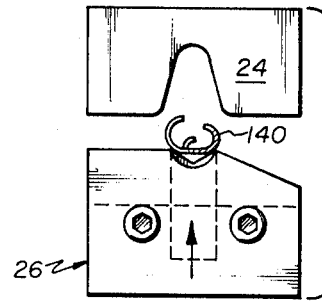
Figure 15:
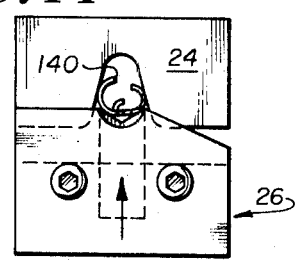

Turning now to FIGS. 12 through 17 there is shown the progression of the die members 24 and 26 of the die set 22 as the same are employed to crimp a connector 140. A conductor has been omitted for the sake of clarity. The connector 140 is of the type described and claimed in the above cited copending application Ser. No. 774,788, filed Nov. 12, 1968. Briefly stated, this connector is generally C-type and arranged to wrap about the exposed shield of a coaxial conductor and be tightened thereupon to join a grounding lead to the shield. As is shown in FIG. 12, the upper die member 24 is shown separated from the lower die member 26 fully exposing nests 54 and 36 respectively. With the die members 24 and 26 in the open position a connector 140 may be inserted and rested upon the nest 36 of the nest block 34 of the lower die member 26, as is seen in FIG. 13. Movable handle 30, of tool 20 in FIG. 1, will now be moved towards the fixed handle 32 causing the ram 28 to move the lower die member 26 towards the upper die member 24. As shown in FIG. 14 a position has been attained in which the connector 140 just enters the nest 54 of the upper die member 24 and crimping action will occur beyond this point. Continued action on the movable handle 30 and the nest block 34 towards the fixed handle 32 causes the connector 140 to enter nest 50 of the upper die member but the nest block 34 of the lower die member 26 as yet has not entered into contact with the walls of the nest 54 of the upper die member 24. The coiling of the connector 140 is due solely to the reduced width of the nest 54 of the upper die member 24.

Figure 16:
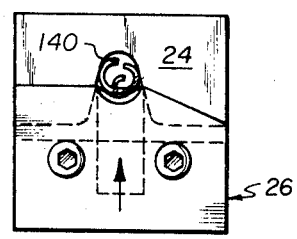
Figure 17:
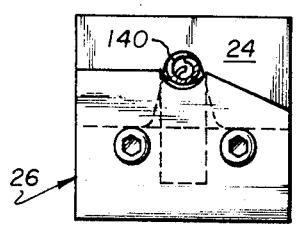

In FIG. 16 the edges of the nest block 34 begin to engage the side of the nest 54 and to exert a force along the sides of the connector 140 causing it, together with the decreased width of the nest 54 to further coil the connector 140. Finally, in FIG. 17 at the topmost portion of the stroke of the ram 28, the upper die member 24 and lower die member 26 are at their closest spacing. Crimping and coiling forces on the connector 140 are exerted by the arcuate portion of the nest 54 and the nest 36 of the nest block 34. Had a conductor and a ground lead been placed within the connector 140 it would tend to resist the closure of the die set 22 and would cause deformance of the nest 36 of the nest block 34. The nest 36 will take on a general configuration of the connector and conductor to insure a uniform application of crimping forces about the surface of the lower portion of the connector 140 in contact therewith. Since the outer edges of the nest 36, of the nest block 34, are in contact with the nest 54 of the upper die member 24 there is no opening through which portions of the connector itself may extrude to provide flash, as is found in prior art devices. Also, since the nest 36 of the nest block 34 deforms to the shape of the connector 140 and the conductor and ground conductor placed therein there is a more uniform application of crimping forces about the entire surface since there is complete contact by the nest 36 of the nest block 34 on the lower portion of the connector and by the nest 54 of the upper die member 24 on the upper surface of the connector 140. In this manner a positive, uniform crimping action takes place and minimizes any distortion of the geometry of the inner insulation of such a coaxial conductor.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

I claim:

1. A die set comprising: a first die member having a first nest thereon; a second die member comprising a first nest block of semirigid, flexible material having a second nest thereon; a first support block having a recess thereon to receive therein said first nest block; and first end blocks coupled to said first support block and retaining said first nest block therebetween.

2. A die set, as defined in claim 1, wherein said second nest has a V-notch contour.

3. A die set, as defined in claim 1, wherein said second nest has an arcuate contour.

4. A die set, as defined in claim 1, wherein said second nest has a contour comprising an arcuate portion bounded by straight line portions.

5. A die set, as defined in claim 1, wherein said first nest has a contour comprising an arcuate portion bounded by straight line portions.

6. A die set, as defined in claim 1, wherein said first die member comprises a second nest block of semirigid, flexible material having said first nest thereon; a second support block having a recess thereon to receive therein said second nest block; and second end blocks coupled to said second support block and retaining said second nest block therebetween.

7. A die set, as defined in claim 1, wherein the recess in said first support block has straight sidewalls and the associated sidewalls of said first nest block are straight.

8. A die set, as defined in claim 1, wherein the recess in said first support block has inclined sides and the associated sidewalls of said first nest block are complementarily inclined.

9. A die set, as defined in claim 1, wherein said first end blocks have recesses therein to expose a portion of said first nest block.

10. A die set, as defined in claim 1, wherein said first end blocks have arcuate recesses therein to expose a portion of said first nest block.

11. A die set, as defined in claim 1, wherein the entry edges of said first end blocks are tapered to permit easy access to said die set.

12. A die set, as defined in claim 1, wherein the spacing between said first end blocks is greater than the length of said first die member.

13. A die set, as defined in claim 1, wherein said first nest block extends above the surface of said first support block and enters said first nest when said first and second die members are engaged whereby the contour of said second nest is controlled by the contour of said first nest.

14. A die set, as defined in claim 1, wherein said first nest block extends above the surface of said first support block and enters said first nest when said first and second die members are engaged whereby the contour of said second nest is controlled by the contour of said first nest and a workpiece placed between said first and second nests.

15. A die set, as defined in claim 1, wherein the surface of said second nest has at least one raised portion thereon.

16. A die set, as defined in claim 1, wherein the surface of said second nest has a plurality of raised portions thereon.

17. A die set, as defined in claim 1, wherein the surface of said second nest has raised portions at the ends thereof adjacent said first end blocks.

18. A die set, as defined in claim 1, wherein the surface of said second nest has raised portions at the ends thereof adjacent said first end blocks and a further raised portion intermediate said raised portions.

19. A die set, as defined in claim 1, wherein the surface of said first nest has at least one raised portion thereon.

20. A die set, as defined in claim 1, wherein the surface of said first nest has a plurality of raised portions thereon.

21. A die set, as defined in claim 1, wherein the surface of said first nest has raised portions at the ends thereof.

22. A die set, as defined in claim 1, wherein the surface of said first nest has raised portions at the ends thereof and a further raised portion intermediate said raised portions.

23. A die set, as defined in claim 12, wherein the inner edges of said first end blocks are tapered to facilitate entry therebetween of said first die member.

24. A die set, as defined in claim 15, wherein the surface of said first nest has at least one further raised portion thereon.

25. A die set, as defined in claim 16, wherein the surface of said first nest has a plurality of further raised portions thereon.

UNITED STATES PATENT OFFICE
CERTIFICATE OF CORRECTION

Patent No. 3,576,122    Dated April 27, 1970

Inventor(s) John J. Churla, Jr.

It is certified that error appears in the above-identified patent and that said Letters Patent are hereby corrected as shown below:

Column 4, line 28, after "to" you omitted -- injure either the connector, or the conductor or so low as to --

Column 4, line 44, delete "55" and insert --54--

Signed and sealed this 10th day of August 1971.

(SEAL)
Attest:

EDWARD M. FLETCHER, JR.
Attesting Officer

WILLIAM E. SCHUYLER,
Commissioner of Paten